US007530060B1

(12) United States Patent
Fontenot et al.

(10) Patent No.: US 7,530,060 B1
(45) Date of Patent: May 5, 2009

(54) METHODS AND COMPUTER PROGRAM PRODUCT FOR OPTIMIZING BINARIES WITH CODING STYLE FORMALIZATION

(75) Inventors: Nathan Fontenot, Cedar Park, TX (US);
Jacob L. Moilanen, Austin, TX (US);
Joel H. Schopp, Austin, TX (US);
Michael T. Strosaker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/970,669

(22) Filed: Jan. 8, 2008

(51) Int. Cl.
*G06F 9/45* (2006.01)
(52) U.S. Cl. ..................... 717/151; 717/154
(58) Field of Classification Search ......... 717/100–103, 717/106–119, 136–143, 151–161; 715/230–232
See application file for complete search history.

(56) References Cited

U.S. PATENT DOCUMENTS

| | | | | |
|---|---|---|---|---|
| 4,989,145 A | * | 1/1991 | Kyushima | 704/9 |
| 5,361,351 A | * | 11/1994 | Lenkov et al. | 717/124 |
| 5,583,988 A | * | 12/1996 | Crank et al. | 714/48 |
| 6,314,558 B1 | * | 11/2001 | Angel et al. | 717/118 |
| 6,564,297 B1 | * | 5/2003 | Kosche | 711/118 |
| 7,188,336 B2 | * | 3/2007 | Humphries | 717/123 |
| 2002/0095665 A1 | * | 7/2002 | Chaudhry et al. | 717/140 |
| 2004/0015899 A1 | * | 1/2004 | May et al. | 717/140 |
| 2004/0123279 A1 | * | 6/2004 | Boykin et al. | 717/158 |
| 2004/0172617 A1 | * | 9/2004 | Ramani et al. | 717/114 |
| 2007/0011654 A1 | | 1/2007 | Opperman | |
| 2007/0288107 A1 | * | 12/2007 | Fernandez-Ivern et al. | 700/91 |
| 2008/0016488 A1 | * | 1/2008 | Adams et al. | 717/100 |

OTHER PUBLICATIONS

IBM Technical Disclosure Bulletin, NN9709125, "Code Optimization by Hints to the Compiler,", vol. 40, No. 9, Sep. 1, 1997. pp. 125-128. (textual printout).*

* cited by examiner

*Primary Examiner*—Lewis A. Bullock, Jr.
*Assistant Examiner*—Jason Mitchell
(74) *Attorney, Agent, or Firm*—Cantor Colburn LLP; Steven Bennett

(57) ABSTRACT

Methods and computer program products for providing warnings and hints related to coding conventions using a coding style definition are provided. A source code is received, and a coding style definition is read. The source code is parsed to determine whether the source code adheres to the conventions in the coding style definition. Warnings are provided to indicate where the source code deviates from the coding style definition, if the source code fails to adhere to the conventions in the coding style definition. If the source code correctly adheres to the conventions in the coding style, hints can be provided to the compiler and linker so that they can optimize effectively using information that the compiler and linker would not normally have.

3 Claims, 3 Drawing Sheets

METHODS AND COMPUTER PROGRAM PRODUCT FOR OPTIMIZING BINARIES WITH CODING STYLE FORMALIZATION

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

The present invention relates generally to compiling source code files, and more particularly to analyzing information regarding coding style to improve compilation of source code files.

Source code includes programming statements and instructions that are written by a programmer in accordance with a given computer programming language, such as C++, Java, or another type of computer programming language. A programmer writes source code, but the source code is not directly executable by a computing system. Rather, the source code is first converted into object code or executable code by a compiler, an assembler, or an interpreter.

Different programmers may prefer different coding styles in writing source code. A coding style is the manner in which source code is displayed. That is, a coding style has to do with the appearance of the source code. A coding style does not affect how the source code is converted into object or executable code. Two source code files can be generated with different coding styles that generate identical object or executable code. Thus, the coding style is intended for the programmer, so that the programmer is able to view the source code in way that he or she prefers the appearance of the source code to be.

Often, many different programmers work on the same source code, and the source code may include many different coding styles. It is desirable for compilers to have easily recognizable standards for codes to optimize more effectively.

SUMMARY

In accordance with exemplary embodiments, methods for providing warnings related to coding conventions using a coding style definition and for providing hints to a compiler and/or linker related to coding conventions using a coding style definition are provided. A source code is received, and a coding style definition is read. The source code is parsed to determine whether the source code adheres to the conventions in the coding style definition. Warnings are provided to indicate where the source code deviates from the coding style definition, in response to determining that the source code fails to adhere to the conventions in the coding style definition. Hints are provided to at least one of a compiler and a linker, in response to determining that the source code correctly adheres to the conventions in the coding style definition In accordance with the exemplary embodiment, a computer program product, tangibly embodied on a computer readable medium, for providing warnings related to coding conventions using a coding style definition and for providing hints to a compiler and/or linker related to coding conventions using a coding style definition are provided. The computer program product includes instructions for causing a computer to execute the above methods.

Additional features and advantages are realized through the techniques of the exemplary embodiment. Other features are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features and advantages of the exemplary embodiment are apparent from the following detailed description taken in conjunction with the accompanying drawings in which:

Figure 1:
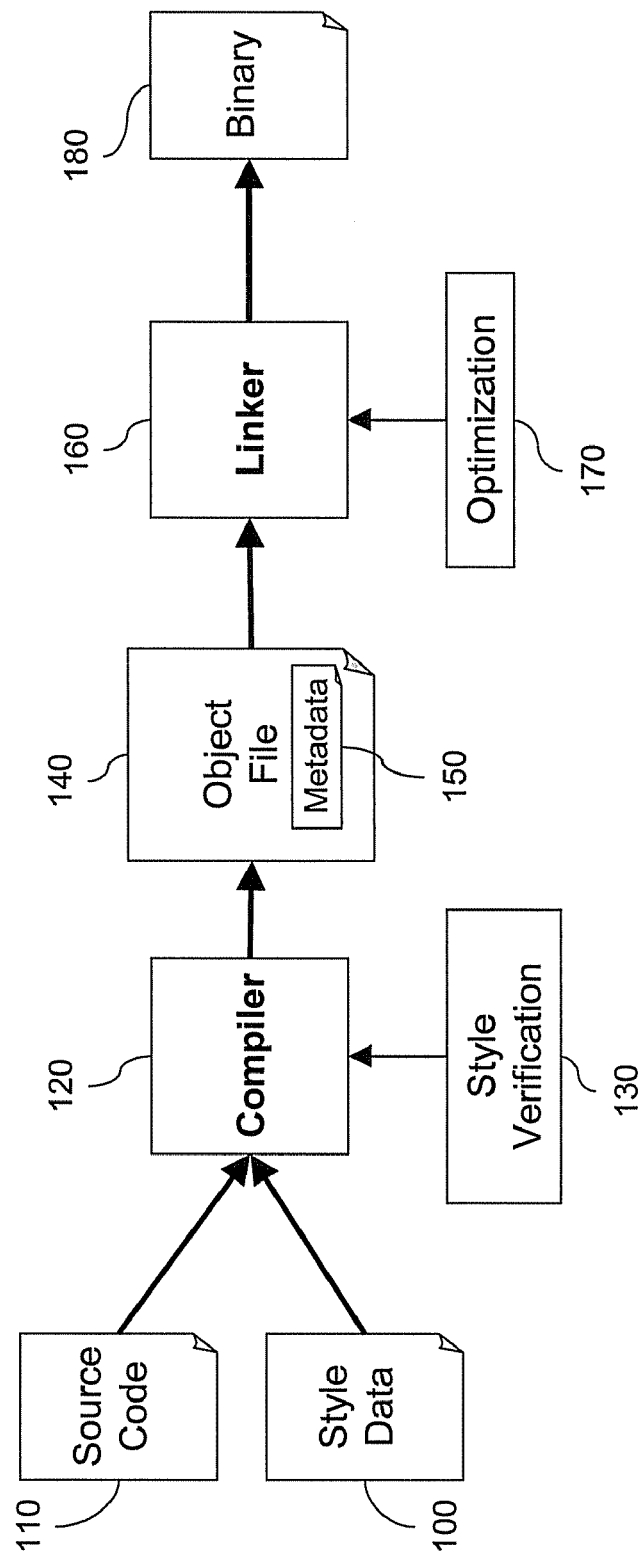
FIG. 1 is a block diagram of a flow of an optimization process through components according to the exemplary embodiment.

The detailed description explains the exemplary embodiments of the invention, together with advantages and features, by way of example with reference to the drawings.

DETAILED DESCRIPTION OF EXEMPLARY EMBODIMENTS

Current compilers can handle different coding styles, but the ability of the compiler to optimize based on easily-recognizable standards can be improved by providing additional knowledge of how variable types and code blocks are utilized in accordance with an exemplary embodiment.

Exemplary embodiments provide a process for a coding style definition language, such that coding conventions can be formalized. In the process, a pre-compiler may read the style definition and parse source code to ensure that the source code adheres to the defined conventions in accordance with the exemplary embodiments. Warnings may be printed to indicate where stylistic deviations are noted. When the source is compiled, the pre-compiler may provide hints to the compiler in order to optimize more effectively.

As non-limiting examples, samples of the optimization may include variable names, such as "rc" as a return code. If rc is compared to a value within a routine, rc can be recognized as a check for error conditions. This allows the compiler to push the resulting error condition check code path to the end of the generated assembly code for the function. There is an advantage to moving error handling code to the end of the assembly code, as it is assumed that error handling code is rarely executed, because errors are less likely than non-errors. If the code to handle errors is at the end of the generated code, then there is more room for "non-error" code earlier in the generated assembly. That means that the non-error code is more likely to be contained within a single page, decreasing the chance that a page fault will have to be taken during normal (non-error) operation. It is understood in the art that swapping pages is time-consuming.

In the exemplary embodiments, data organization can be improved. As a non-limiting example, anything starting with spinlock_ is a spinlock, and a hint can be provided to the compiler that the value is likely to be temporally silent. The compiler could then put the data on its own cacheline or adjacent to other changing data.

Identifying a variable as temporally silent provides an advantage on multiprocessor systems. The multi-processor system needs to ensure that data is consistent, so that if one processor changes the data, the change is reflected in what all the other processors see. This may be complicated because of the existence of a cache associated with each processor in the multi-processor system. Roughly, the cache is a copy of the data in very fast memory that only one computer processing unit (CPU) can access. If the CPU changes data in its cache, the multi-processor system needs to ensure that the change is made in the caches of all the other CPUs that may have also cached the data in question. However, there are certain types of data that are more likely to only be accessed by a single CPU, such as a "spinlock" (which is an operating system concept). A spinlock may be switched from 0 to 1, and then back to 0, without any other CPU being interested in that data. When data changes to a new value and then changes back to the original value before any other CPU looks at the value, it is called a "temporally silent store". If the compiler can tell the system that changes to a particular variable (in this case, a spinlock) is likely to be temporally silent, the system can avoid the expensive operation of refreshing the caches of the other CPUs unless refreshing is absolutely necessary. Similarly, by storing data that is likely to change in adjacent locations in memory, this increases the chance that when the system synchronizes cachelines between CPUs, multiple pieces of changed data will be picked up at the same time, reducing the overall number of synchronizations that are performed.

Furthermore, forcing adherence to the formalized coding style in the compiler during compilation can enhance the analysis of static analysis tools such as BEAM and COVERITY. BEAM and COVERITY are both analysis tools that search through source code to look for patterns that may indicate bugs in the generated program. Just as it does with compilers, the exemplary embodiments can provide additional information to analysis tools (such as BEAM and COVERITY or similar programs) in order to make assumptions that the analysis tools would not ordinarily be able to make.

In the exemplary embodiments, flags may be specified which can signal instrumentation points for analysis tools that utilize dynamic probes. For example, by ensuring that the names of all error handling subroutines start with the text string "_error_" in accordance with the exemplary embodiments, using the flags, an analysis tool could automatically know to put dynamic probes at those locations in order to identify when the system is handling an error condition. Similarly, if logging subroutines names all start with "_log_" in accordance with the exemplary embodiments, using the flags, an analysis program could know to put probes at those locations in order to obtain logging information. A dynamic probe provides the ability to add code to an already-compiled binary, so that the behavior of an existing program can be changed. In this case, an external program may be used to automatically tie into error handling and logging subroutines of the exemplary embodiments to perform an action (like, e.g., notifying a system administrator of a critical error condition). Additionally, if an entire project adheres to the same coding style, code readability is improved, maintenance is eased, and the likelihood of certain kinds of bugs is reduced in accordance with the exemplary embodiments.

In accordance with the exemplary embodiments, non-limiting examples of the code style may include ensuring that all tabs are tabs and not 8 spaces, checking for extraneous space at the end of lines, checking whether the use of braces is consistent, and ensuring that function definitions are similar. As a non-limiting example, the process may be performed to ensure that code style adheres to the Linux kernel coding guidelines.

In the exemplary embodiments, the coding style definitions in the process may be laid out in a file that is read in by the compiler during a pre-compile pass. In the process, the coding style definitions may be used to ensure that the source code adheres to the specified language definitions and to generate any compiler hints. Any failures to adhere to the coding style definition could generate compile errors depending on the level of error reporting specified on the compile command line, in the exemplary embodiments. The information gathered during this pre-compile phase can then be used by the compiler during code generation and optimization phases, in accordance with the exemplary embodiments.

FIG. 1 is a block diagram of a process illustrating an implementation of the exemplary embodiments. In the exemplary embodiment, style data 100 and source code 110 are provided to compiler 120. As non-limiting examples of information related to the style data 10, consider that variables starting with "rc" will store the return code from a subroutine; "spinlocks" are likely to be temporally silent; and subroutines starting with "_log_" are used to log data, and therefore the subroutines have a number (severity) as the first parameter and a string (description) as the second parameter.

Style verification 130 is performed at the compiler 120. In a non-limiting example, the compiler 120 may note that variables "rc" may be used to store the return code from a subroutine invocation, and the compiler 120 would output a style error if "rc" is used for something else. In conjunction with the style verification 130, the compiler 120 may note that any subroutine starting with "_log_" must have a number as its first parameter and a string as its second parameter, and the compiler 120 would output a style error if it did not.

The compiler 120 outputs an object file 140. The object file 140 includes metadata 150. As non-limiting examples, the metadata 150 may include information, such as which memory areas are temporally silent (the ones identified as "spinlocks" in the source code), so that a linker 160 can store that information in the resulting binary. That information would be used when the program is loaded (executed), so that the platform can be notified that the specified memory region is temporally silent and can be optimized during runtime as such.

The object file 140 is passed to the linker 160. An optimization module 170 performs optimization at the linker 160. As a non-limiting example, the linker 160 may move error handling code to the end of a block of assembled code, so that the error handling code could potentially appear on a different page if the subroutine is large enough. The linker 160 outputs a binary result 180 in accordance with the exemplary embodiments.

In the exemplary embodiments, the source code 110 is parsed in the compiler 120. Warnings may be generated to the user when the program is compiled if the compilation did not meet the style conventions of the style verification 130. As an option in the exemplary embodiments, the compilation may fail if the compilation did not meet the style conventions of the style verification 130. As a non-limiting example, the style data 100 may be a file that is generated by a programmer, and the style data 100 adheres to a format. The compiler 120 reads the file of the style data 100 along with the source code 110 to determine what stylistic conventions should be enforced upon the source code 110. Some of the hints provided by the style data 100 file are immediately useful to the compiler 120, and some would be passed to the linker 160 (e.g., via the metadata 150 in the object file 140) so that the linker 160 can perform optimizations based on those hints. Further, instrumentation points may be signaled for analysis tools that use dynamic probing, in response to the warnings indicating the source code deviations.

Figure 2:
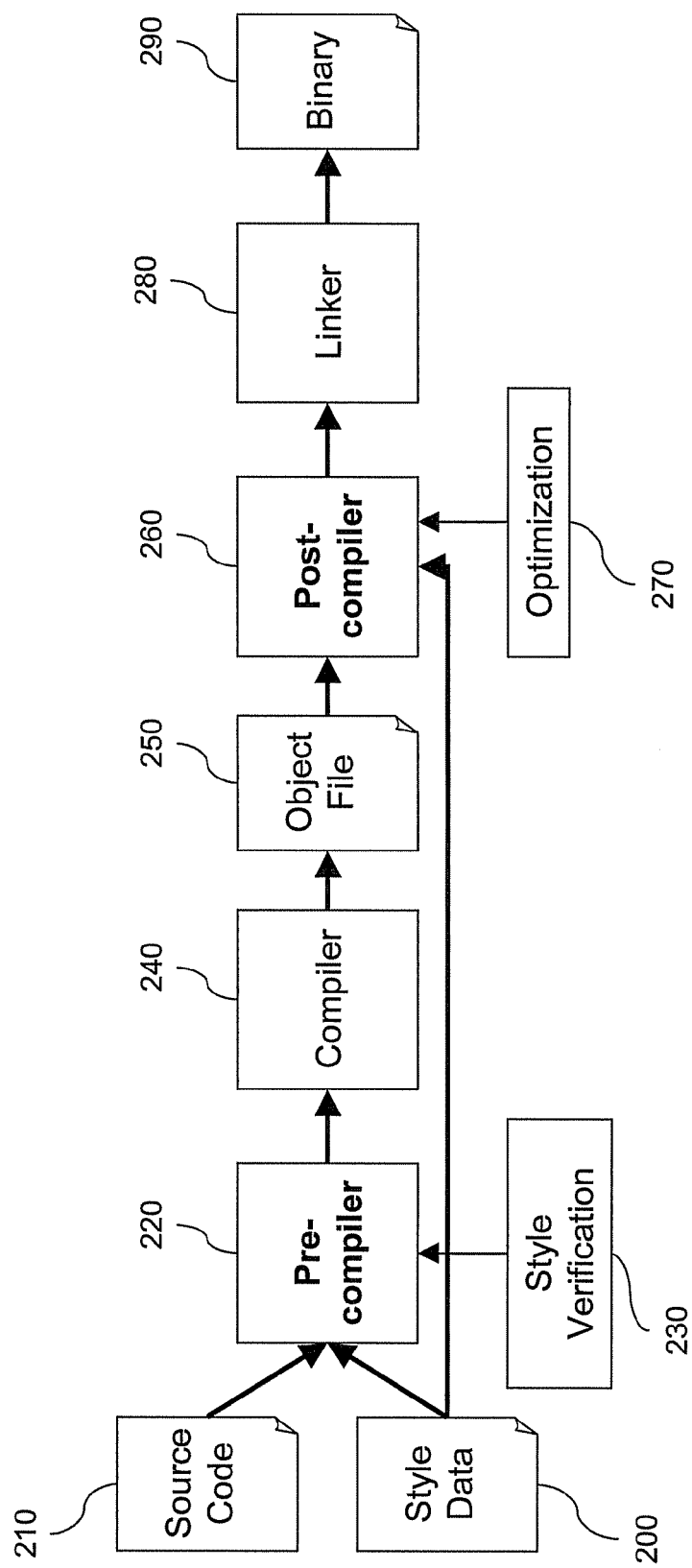
FIG. 2 is a block diagram of a flow of an optimization process through components according to the exemplary embodiment.

FIG. 2 is a block diagram of a process illustrating an implementation of the exemplary embodiment. In the exemplary embodiment, style data 200 and source code 210 are provided to a pre-compiler 220. Style verification 230 is performed at the pre-compiler 220. The output of the pre-compiler 220 is passed to the compiler 240. The compiler 240 outputs an object file 250. A post-compiler 260 receives the object file 250 and the style data 200. An optimization 270 is performed at the post-compiler 260. The output of the post-compiler 260 is passed to a linker 280. The linker 280 outputs a binary 290 in accordance with the exemplary embodiment.

As seen herein, the diagram in FIG. 2 is similar to the diagram in FIG. 1. In FIG. 1, the exemplary embodiment provides modifications to the compiler 120 and the linker 160. In FIG. 1, the exemplary embodiment is implemented without modifications to the compiler 240 and the linker 280, but includes the pre-compiler 220 and the post-compiler 260. Moreover, the pre-compiler 220 and the post-compiler 260 in FIG. 2 provide the extra functionality that was provided at the compiler 120 and the pre-compiler 220 in FIG. 1. Since the compiler 240 is not modified, there is no metadata stored in the object file 250, so the style data 200 is provided directly to the post-compiler 260.

Figure 3:
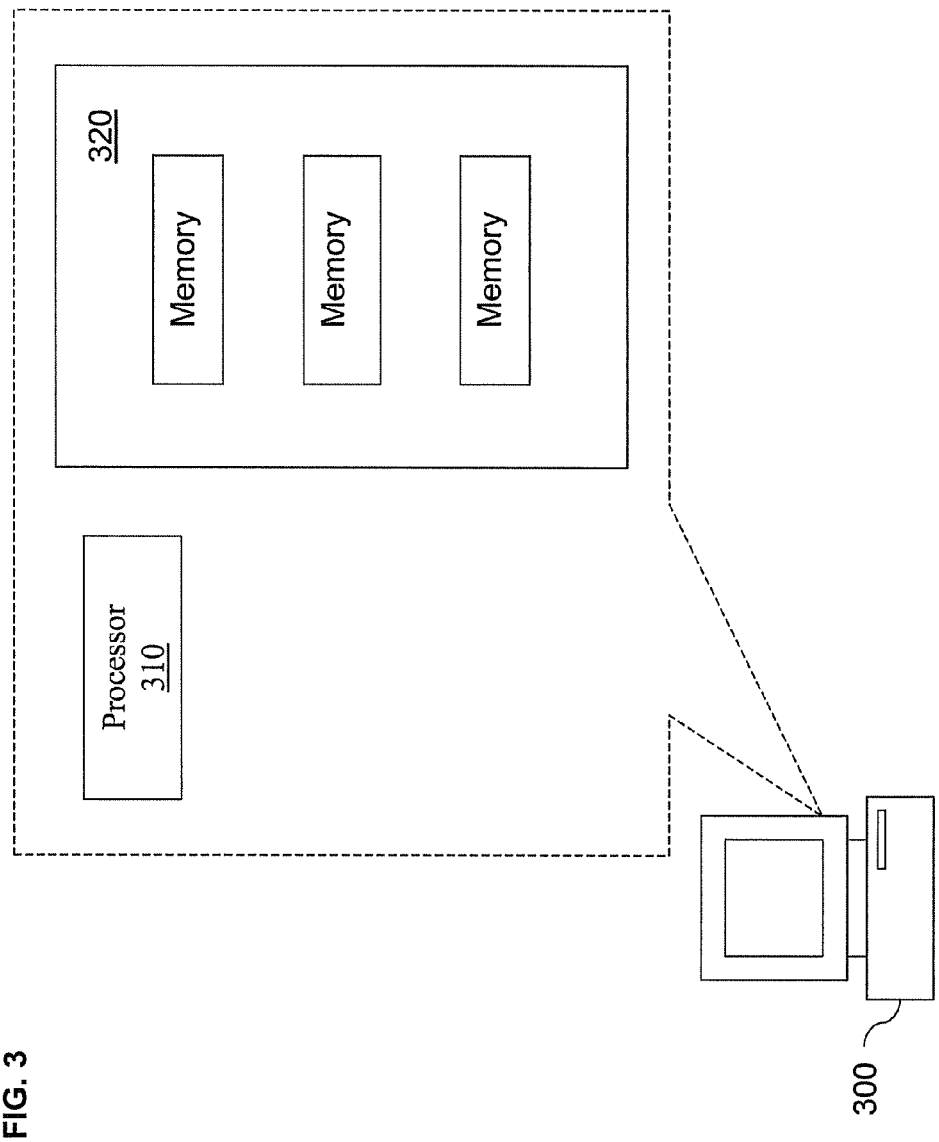
FIG. 3 illustrates an exemplary device for implementing the exemplary embodiment.

FIG. 3 illustrates an exemplary device for implementing the exemplary embodiment. As a non-limiting example, the exemplary embodiment may be implemented in a device 300 (e.g., general purpose computer) which includes one or more processors 310 executing computer program code stored on a storage medium 320 in order to perform the processes described herein. The device 300 may include or may be operatively coupled to a display screen. It is understood that other processor-based devices (e.g., servers) may implement the exemplary process described herein.

The capabilities of the present disclosure can be implemented in software, firmware, hardware or some combination thereof. As one example, one or more aspects of the exemplary embodiment can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the exemplary embodiment can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While exemplary embodiments of the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for providing warnings related to coding conventions using a coding style definition and hints to at least one of a compiler and a linker, the method comprising:
   receiving a source code;
   reading a coding style definition related to the source code, wherein the coding style definition includes style data for stylistic conventions and optimization hints;
   generated by a programmer, and wherein the coding style definition is the appearance in which the source code is displayed and optimization hints associate the stylistic conventions with possible optimizations to be performed by a compiler or a linker;
   parsing the source code to determine whether the source code adheres to the conventions in the coding style definition;
   providing warnings to indicate where the source code deviates from the coding style definition, in response to determining that the source code fails to adhere to the conventions in the coding style definition; and
   providing the optimization hints associated with the stylistic conventions found in the source code to the compiler and the linker, in response to determining that the source code correctly adheres to the style data for stylistic conventions in the coding style definition.

2. The method of claim 1, further comprising signaling instrumentation points for analysis tools that use dynamic probing, in response to the warnings indicating the source code deviations.

3. The method of claim 1 being tangibly embodied on a computer readable medium as a computer program product for providing warnings related to coding conventions using a coding style definition, wherein the computer program product includes instructions for causing a computer to execute the method of claim 1.

* * * * *